United States Patent
Beckwith et al.

(10) Patent No.: US 12,526,364 B2
(45) Date of Patent: Jan. 13, 2026

(54) SYSTEMS AND METHODS FOR DNN-BASED DATA INTERCEPTS

(71) Applicant: DISH Wireless L.L.C., Littleton, CO (US)

(72) Inventors: William C. Beckwith, Washington, DC (US); Mehdi Alasti, Arlington, VA (US)

(73) Assignee: DISH Wireless L.L.C., Littleton, CO (US)

( * ) Notice: Subject to any disclaimer, the term of this patent is extended or adjusted under 35 U.S.C. 154(b) by 320 days.

(21) Appl. No.: 18/462,963

(22) Filed: Sep. 7, 2023

(65) Prior Publication Data

US 2025/0088585 A1 Mar. 13, 2025

(51) Int. Cl.
*H04M 3/22* (2006.01)
(52) U.S. Cl.
CPC .................. *H04M 3/2281* (2013.01)
(58) Field of Classification Search
CPC .................................................. H04M 3/2281
See application file for complete search history.

(56) References Cited

U.S. PATENT DOCUMENTS

| | | | | |
|---|---|---|---|---|
| 8,553,588 B2* | 10/2013 | Jayaraman | ........ | H04W 36/1446 370/230.1 |
| 2010/0086119 A1* | 4/2010 | De Luca | ............. | H04M 7/0063 379/213.01 |
| 2015/0220625 A1* | 8/2015 | Cartmell | ............. | G06F 16/9014 707/754 |

* cited by examiner

*Primary Examiner* — Kathy W Wang-Hurst
(74) *Attorney, Agent, or Firm* — Kilpatrick Townsend & Stockton LLP

(57) ABSTRACT

A system may receive, a request for communications data of a first data type and a second data type, the communications data associated with a target user equipment. The system may provision the wireless network to fulfill the request for communications data. The system may configure a first network function to generate first duplicated data, and a second network function to generate second duplicated data. The system may receive a first communication of the first data type and a second communication of the second data type. The system may generate the first duplicated data based on the first communication and transmit the first communication to a respective intended recipient and the first duplicated data to a mediation and delivery function. The system may generate the second duplicated data and transmit the second communications data to the respective destination and the second duplicated data to the mediation and delivery function.

20 Claims, 7 Drawing Sheets

SYSTEMS AND METHODS FOR DNN-BASED DATA INTERCEPTS

BACKGROUND

Law enforcement sometimes require network providers to intercept communications to and from a particular device. As wireless networks have become more complex and distributed, intercepting the communications has become more difficult. Some intercept requests may only ask for a certain type of communications. Other communications may be, in effect, intercepted twice, leading to issues when attempting to utilize the intercepted communications.

SUMMARY

A method may include receiving, by an admin function of a wireless network, a request for communications data of a first data type and a second data type, the communications data associated with a target user equipment. The method may also include provisioning, by the admin function, the wireless network to fulfill the request for communications data. The provisioning may further include configuring, at least in part by the admin function of the wireless network, a first network function of the wireless network to generate first duplicated data based on the communications data of the first data type. The provisioning may also include configuring, at least in part by the admin function of the wireless network, a second network function of the wireless network to generate second duplicated data based on the communications data of the second data type. The method may also include receiving, by the first network function of the wireless network, at least one of a first communication of the first data type and a second communication of the second data type, each of the first communication and the second communication associated with the target user equipment and a respective intended recipient. The method may then include generating, by the first network function of the wireless network, the first duplicated data based on the first communication of the first data type. The method may then include transmitting, by the first network function of the wireless network, the first communication to a respective intended recipient and the first duplicated data to a mediation and delivery function of the wireless network. The method may also include generating, by the second network function of the wireless network, the second duplicated data based on the second communication of the second data type. The method may then include transmitting, by the second network function of the wireless network, the second communications of the second data type to the respective destination and the second duplicated data to the mediation and delivery function such that the request is fulfilled.

In some embodiments, the method may include determining, by the first network function of the wireless network, the first data type of the first communication based at least in part on a first data network name or access point name. The method may also include determining, by the first network function of the wireless network, the second data type of the second communication based at least in part on a second data network name or access point name. The second communication of the second data type may include voice data and the first network function may be a user plane function. The second network function may be an internet protocol multimedia subsystem. The mediation and delivery function may be associated with a law enforcement agency. The first communication of the first data type may include at least one of multimedia messaging service data and internet data, and the first network function may be a user plane function.

In some embodiments, the first network function may be a first user plane function configured to process voice data and the second network function may be a second user plane function configured to process at least one of internet data, multimedia messaging system data, and short messaging system data. The request may be received from the admin function over a first interface and at least one of the first duplicate data and the second duplicate data may be transmitted to the mediation and delivery function over a second interface. Provisioning the wireless network further may include instantiating the mediation and delivery function.

A system may include one or more processors and a non-transitory, computer-readable medium may including instructions that, when executed by the one or more processors, cause the system to perform operations. According to the operations, the system may receive, by an admin function of a wireless network, a request for communications data of a first data type and a second data type, the communications data associated with a target user equipment. The system may also provision, by the admin function, the wireless network to fulfill the request for communications data. As part of the provisioning, the system may configure, at least in part by the admin function of the wireless network, a first network function of the wireless network to generate first duplicated data based on the communications data of the first data type. The system may also configure, at least in part by the admin function of the wireless network, a second network function of the wireless network to generate second duplicated data based on the communications data of the second data type. The system may receive, by the first network function of the wireless network, at least one of a first communication of the first data type and a second communication of the second data type, each of the first communication and the second communication associated with the target user equipment and a respective intended recipient. The system may then generate, by the first network function of the wireless network, the first duplicated data based on the first communication of the first data type. The system may transmit, by the first network function of the wireless network, the first communication to a respective intended recipient and the first duplicated data to a mediation and delivery function of the wireless network. The system may generate, by the second network function of the wireless network, the second duplicated data based on the communication of the second data type. The system may then transmit, by the second network function of the wireless network, the second communications data of the second data type to the respective destination and the second duplicated data to the mediation and delivery function such that the request is fulfilled.

In some embodiments, the operations further cause the system to determine, by the first network function of the wireless network, the first data type of the first communication based at least in part on a first data network name and/or a first access point name. The system may then determine, by the first network function of the wireless network, the second data type of the second communication based at least in part on a second data network name and/or a second access point name. The admin function may utilize at least one of the first data network name, a first access point name, a second data network name, and a second access point name, to configure the first network function and the second network function. The mediation and delivery function may be associated with at least one of a law enforcement agency and the target user equipment. The mediation and delivery function may be configured to transmit data associated with a plurality of target user equipment corresponding to a plurality of requests. The wireless network may include a standalone 5G network.

A non-transitory computer-readable medium may include instructions that, when executed by a processor, cause the processor to perform operations. The operations may include receiving, by an admin function of a wireless network, a request for communications data of a first data type and a second data type, the communications data associated with a target user equipment. The operations may also include provisioning, by the admin function, the wireless network to fulfill the request for communications data. The provisioning may further include configuring, at least in part by the admin function of the wireless network, a first network function of the wireless network to generate first duplicated data based on the communications data of the first data type. The provisioning may also include configuring, at least in part by the admin function of the wireless network, a second network function of the wireless network to generate second duplicated data based on the communications data of the second data type. The operations may also include receiving, by the first network function of the wireless network, at least one of a first communication of the first data type and a second communication of the second data type, each of the first communication and the second communication associated with the target user equipment and a respective intended recipient. The operations may then include generating, by the first network function of the wireless network, the first duplicated data based on the first communication of the first data type. The operations may then include transmitting, by the first network function of the wireless network, the first communication to a respective intended recipient and the first duplicated data to a mediation and delivery function of the wireless network. The operations may also include generating, by the second network function of the wireless network, the second duplicated data based on the second communication of the second data type. The operations may then include transmitting, by the second network function of the wireless network, the second communications of the second data type to the respective destination and the second duplicated data to the mediation and delivery function such that the request is fulfilled.

In some embodiments, provisioning the wireless network further may include instantiating the mediation and delivery function. The first network function may be a first user plane function configured to process voice data and the second network function may be a second user plane function configured to process at least one of internet data, multimedia messaging system data, and short messaging system data. The request may be received from the admin function over a first interface and at least one of the first duplicate data and the second duplicate data may be transmitted to the mediation and delivery function over a second interface. The admin function may utilize at least one of a first data network name and a second network name to configure the first network function and the second network function.

DETAILED DESCRIPTION

Figure 1A:
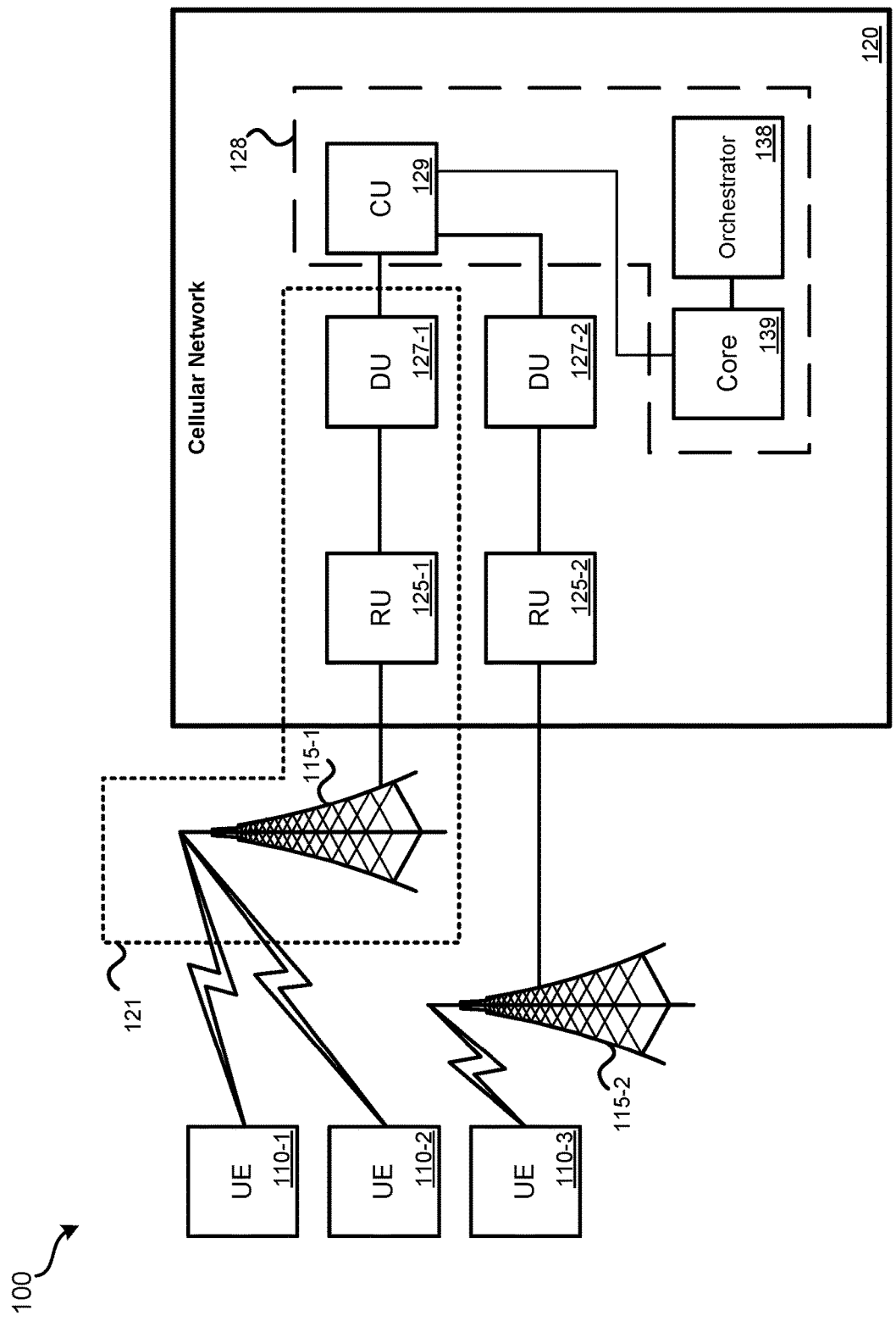
FIG. 1A illustrates an embodiment of a cellular network system, according to certain embodiments.

Law enforcement may wish to intercept communications data of a target user equipment (UE) during an investigation or other law enforcement action. A law enforcement agency may provide a 5G wireless network provider with an intercept request (e.g., a warrant). The 5G wireless network provider may therefore be required to intercept and provide the communications data to the law enforcement agency. In order to comply with the intercept request, the 5G wireless network provider may duplicate communications data associated with the target UE and provide the duplicated data to the law enforcement agency. The duplicated data may subsequently be presented in court and authenticated as real and unaltered by a person.

In a 5G network, there may be several functions that may be configured to intercept the communications data in order to comply with the intercept request. For example, all communications (and associated communications data) may be first processed by a user plane function (UPF) of the 5G network. Therefore, it may seem logical to intercept all communications data at the UPF, duplicate the data, then provide the duplicated data to the law enforcement agency. However, the communications data may be subsequently processed by subsequent functions of the 5G network. Some of the subsequent functions may provide more information associated with the communications data than the UPF. Some data types may handled solely by the UPF, while other data types may be further processed by different functions, making the interception of communications data more complicated.

For example, a voice call may be initiated by the target UE. The voice call may therefore include voice data. The voice data may first be received by the UPF. The voice data may then be processed by an internet protocol multimedia service (IMS). The IMS may be able to provide information associated with the voice call such as call forwarding information, call back information, a target number (i.e., the destination of the voice call), and other such information. In a normal, un-intercepted call, the voice data would then be processed (at least in part) by functions such as a session management function (SMF), a session border control function (SBC), and other such functions. The voice data may then be transmitted to an intended recipient. To comply with an intercept request, however, the voice data may be duplicated at the IMS, the transmitted to the law enforcement agency.

While the IMS may duplicate the voice data and transmit the duplicated data to the law enforcement agency, the UPF may also be configured to duplicate all communications data (including the voice data) and transmit the duplicated data to the law enforcement agency. The law enforcement agency may therefore be provided with two sets of voice data. When presented in court, the duplicate voice data from different sources may lead to authentication issues, rendering the intercepted voice data unusable. Furthermore, an intercept request may only include a request for a certain data type. If all communications data is being intercepted, then more data than is requested may be being captured, leading to more issues for the requesting agency. Therefore, there is a need to configure 5G network functions and/or components to only capture certain types of communications data according to an intercept request.

One solution may be to utilize a data name network (DNN) associated with communications data of various data types (e.g., voice data, short messaging service (SMS) data, multimedia messaging service (MMS) data, internet data, etc.), etc.) and enable or disable lawful intercept per DNN basis. The DNN associated with each data type may be generally used to properly route the various data types to the appropriate network functions or anchor points. However, the DNN may enable communications data to be intercepted more efficiently. For example, a 5G network provider may receive an intercept request for all data types (e.g., voice data, MMS data, internet data, etc.). An admin function (ADMF) of a 5G network may then cause one or more network functions to be provisioned according to the intercept request. The ADMF may cause a mediation and delivery function (MDF3) to be provisioned within the 5G network, where the MDF3 provides intercepted communications data to a law enforcement agency (LEA) requesting the intercept. The ADMF may also provision (or configure) the UPF to identify communications from a target UE to be intercepted. The UPF may also be configured via the ADMF to identify a data type of any communications from the target UE based upon a DNN associated with the communications. The UPF may then be configured to only intercept the MMS data and internet data, while not intercepting the voice data, again based on the DNN of each data type. The ADMF may then configure the IMS to intercept voice data. The UPF and the IMS may then transmit the respective intercepted data to the MDF3. Because the UPF is configured to not intercept the voice data based on the DNN, the MDF3 may therefore only receive one set of voice data, alleviating issues stemming from duplicate copies of the voice data. Furthermore, if the intercept request only requires internet data (or any other data type), the UPF may be configured to only intercept internet data. The systems and techniques described herein may therefore allow the 5G network provider to comply with an intercept request while reducing issues stemming from intercepting more data than is requested and/or intercepting duplicate data.

FIG. 1A illustrates an embodiment of a cellular network system 100 ("system 100"), according to certain embodiments. System 100 can include a 5G New Radio (NR) cellular network; other types of cellular networks, such as 4G LTE, 6G, 7G, etc. are also possible. System 100 can include: UE 110 (UE 110-1, UE 110-2, UE 110-3); base station 115; cellular network 120; radio units 125 ("RUs 125"); distributed units 127 ("DUs 127"); centralized unit 129 ("CU 129"); core 139, and orchestrator 138. FIG. 1A represents a component level view. In a virtualized open radio access network (O-RAN), because components can be implemented as software in the cloud, except for components that need to receive and transmit RF, the functionality of various components can be shifted among different servers, for which the hardware may be maintained by a separate (public) cloud-service provider, to accommodate where the functionality of such components is needed, as detailed in relation to FIG. 2.

UE 110 can represent various types of end-user devices, such as smartphones, cellular modems, cellular-enabled computerized devices, sensor devices, manufacturing equipment, gaming devices, access points (APs), any computerized device capable of communicating via a cellular network, etc. UE can also represent any type of device that has incorporated a 5G interface, such as a 5G modem. Examples include sensor devices, Internet of Things (IoT) devices, manufacturing robots; unmanned aerial (or land-based) vehicles, network-connected vehicles, environmental sensors, etc. UE 110 may use RF to communicate with various base stations of cellular network 120. As illustrated, two base stations 115 (BS 115-1, 115-2) are illustrated. Real-world implementations of system 100 can include many (e.g., hundreds, thousands) of base stations, and many RUs, DUs, and CUs. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT, such as 4G Long Term Evolution (LTE). The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1) located on site at the base station. In some embodiments, the DU may be physically remote from the RU. For instance, multiple DUs may be housed at a central location and connected to geographically distant (e.g., within a couple kilometers) RUs.

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, RUs, DUs, and CUs create a gNodeB, which serves as the radio access network (RAN) of cellular network 120. CU 129 can communicate with core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or core 139. Other DUs may or may not have this capability.

At a high level, the various components of a gNodeB can be understood as follows: RUs perform RF-based communication with UE. DUs support lower layers of the protocol stack such as the radio link control (RLC) layer, the medium access control (MAC) layer, and the physical communication layer. CUs support higher layers of the protocol stack such as the service data adaptation protocol (SDAP) layer, the packet data convergence protocol (PDCP) layer and the radio resource control (RRC) layer. A single CU can provide service to multiple co-located or geographically distributed DUs. A single DU can communicate with multiple RUs.

Figure 1B:
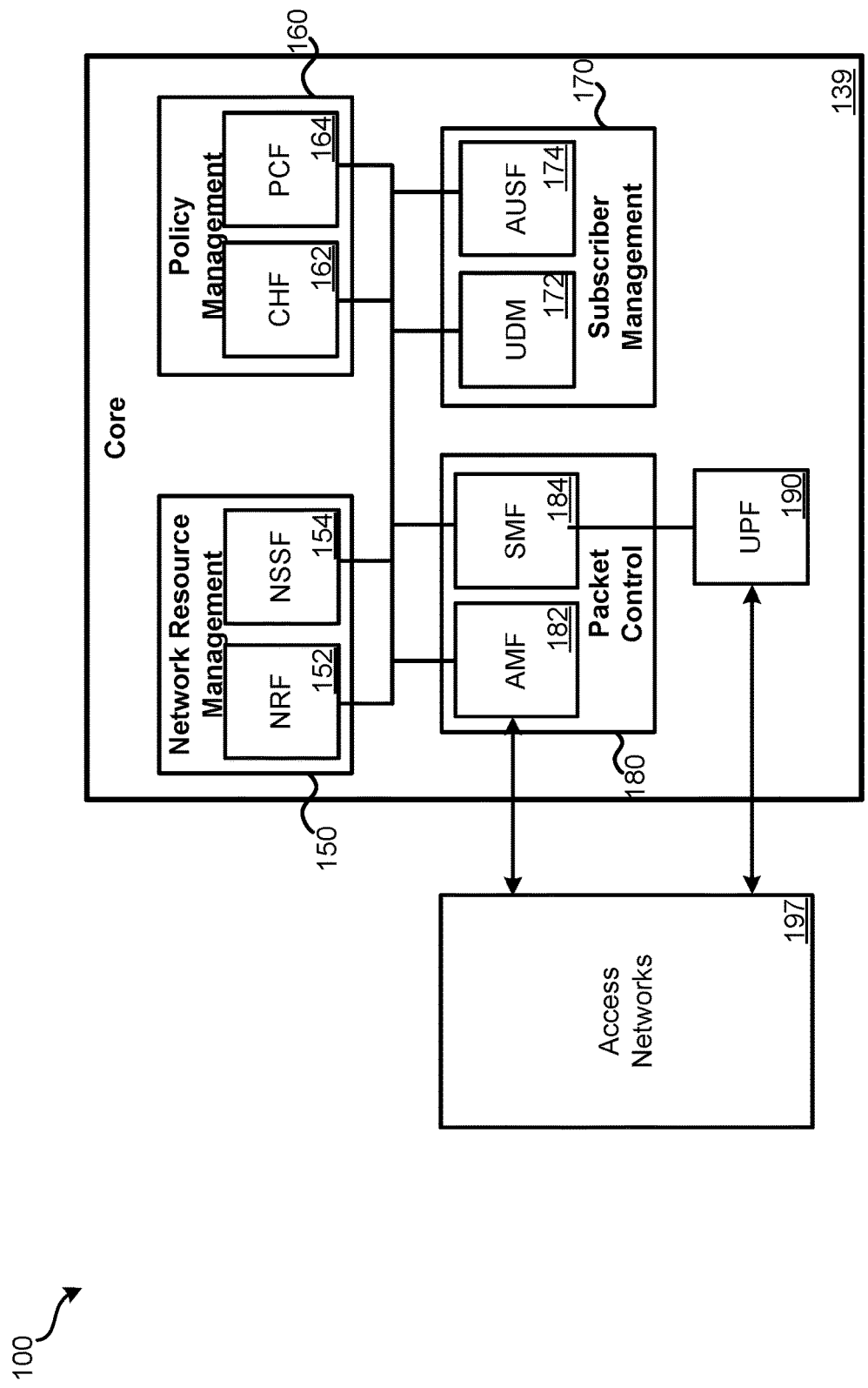
FIG. 1B illustrates an exemplary core, according to certain embodiments.

Further detail regarding exemplary core 139 is provided in relation to FIG. 1B. FIG. 1B illustrates an exemplary core 139, according to certain embodiments. The exemplary core 139 can be physically distributed across data centers or located at a central national data center (NDC) as detailed in relation to FIG. 2, can perform various core functions of the cellular network. Core 139 can include: network resource management components 150; policy management components 160; subscriber management components 170; and packet control components 180. Individual components may communicate on a bus, thus allowing various components of core 139 to communicate with each other directly. Core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CIF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) (e.g., the Internet) or various access networks 197. Access networks 197 can include the RAN of cellular network 120 of FIG. 1A.

While FIGS. 1A and 1B illustrate various components of cellular network 120, it should be understood that other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In a virtualized arrangement, specialized software on general-purpose hardware may be used to perform the functions of components such as DU 127, CU 129, and core 139. Functionality of such components can be co-located or located at disparate physical server systems. For example, certain components of core 139 may be co-located with components of CU 129.

In a possible O-RAN implementation, DUs 127, CU 129, core 139, and/or orchestrator 138 can be implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, core 139, and orchestrator 138. In some embodiments, DUs 127 may be partially or fully added to cloud-based cellular network components 128. Such cloud-based cellular network components 128 may be executed as specialized software executed by underlying general-purpose computer servers. Cloud-based cellular network components 128 may be executed on a public third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested. A "public" cloud-based computing platform refers to a platform where various unrelated entities can each establish an account and separately utilize the cloud computing resources, the cloud computing platform managing segregation and privacy of each entity's data.

Kubernetes, or some other container orchestration platform, can be used to create and destroy the logical DU, CU, or 5G core units and subunits as needed for the cellular network 120 to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU no longer exists, Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU, orchestrator 138 can perform a pipeline of calling the DU code from a software repository incorporated as part of, or separate from, cellular network 120; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus, optimization between performance and cost is desirable.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

As illustrated in FIG. 1A, UE 110 may be operating on one or more production slices of cellular network 120. As detailed later in this document, UE that function on a particular entity's local network may be assigned to a slice particular to the entity or a slice that provides a particular QoE for tasks to be performed by the entity's UE.

Components such as DUs 127, CU 129, orchestrator 138, and core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
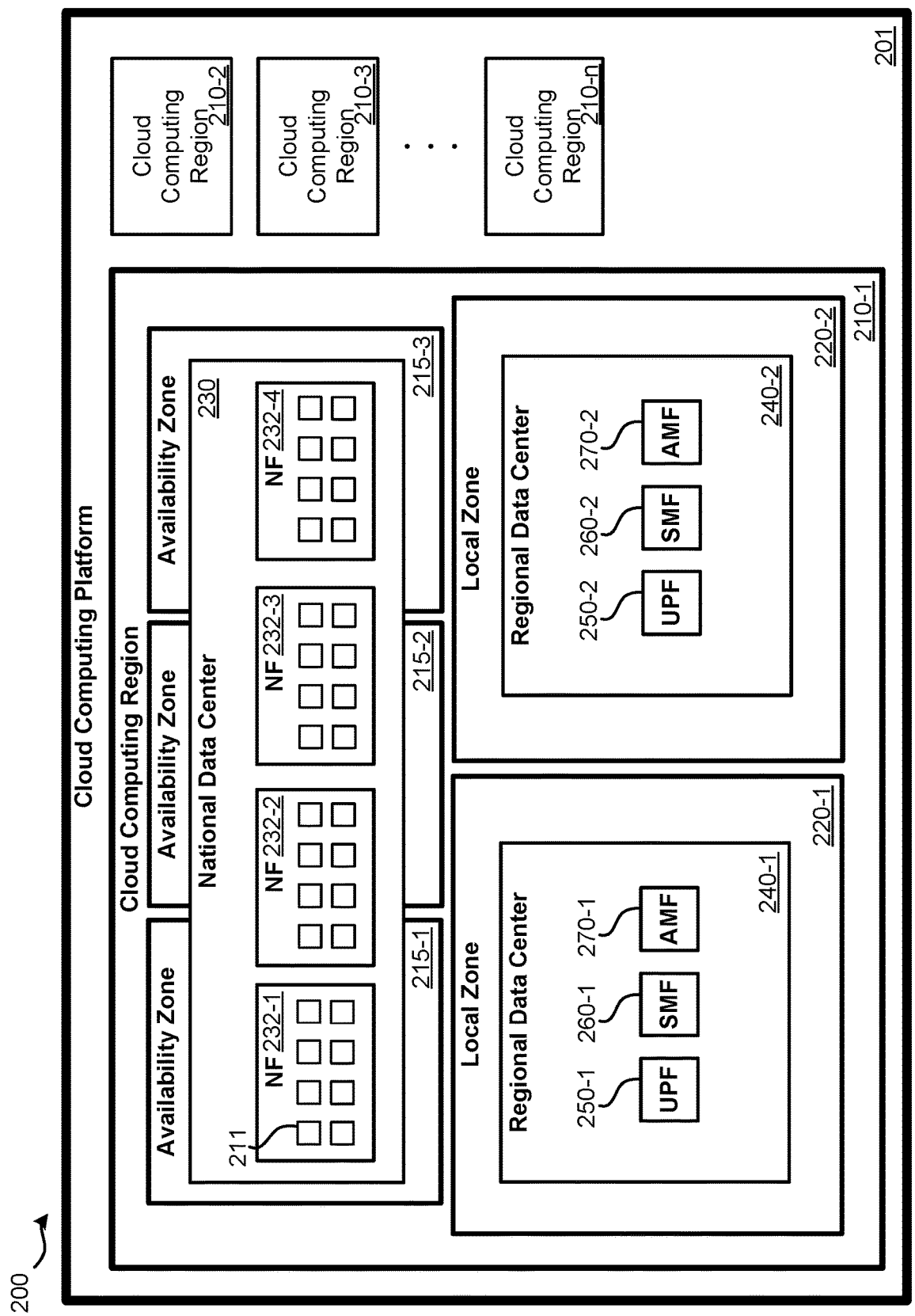
FIG. 2 illustrates an embodiment of a cellular network core network topology as implemented on a public cloud-computing platform, according to certain embodiments.

FIG. 2 illustrates an embodiment of a cellular network core network topology 200 as implemented on a public cloud-computing platform, according to certain embodiments. Cellular network core network topology 200 can represent how logical cellular network groups are distributed across cloud computing infrastructure of cloud computing platform 201. Cloud computing platform 201 can be logically and physically divided up into various different cloud computing regions 210. Each of cloud computing regions 210 can be isolated from other cloud computing regions to help provide fault tolerance, fail-over, load-balancing, and/ or stability and each of cloud computing regions 210 can be composed of multiple availability zones, each of which can be a separate data center located in general proximity to each other (e.g., within 600 miles). Further, each of cloud computing regions 210 may provide superior service to a particular geographic region based on physical proximity. For example, cloud computing region 210-1 may have its datacenters and hardware located in the northeast of the United States while cloud computing region 210-2 may have its datacenters and hardware located in California. For simplicity, the details of the cellular network as executed in only cloud computing region 210-1 is illustrated. Similar components may be executed in other cloud computing regions of cloud computing regions 210 (210-2, 210-3, 210-$n$).

In other embodiments, cloud computing platform 201 may be a private cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

Each of cloud computing regions 210 may include multiple availability zones 215. Each of availability zones 215 may be a discrete data center or group of data centers that allows for redundancy that allows for fail-over protection from other availability zones within the same cloud computing region. For example, if a particular data center of an availability zone experiences an outage, another data center of the availability zone or separate availability zone within the same cloud computing region can continue functioning and providing service. A logical cellular network component, such as a national data center, can be created in one or across multiple availability zones 215. For example, a database that is maintained as part of NDC 230 may be replicated across availability zones 215; therefore, if an availability zone of the cloud computing region is unavailable, a copy of the database remains up-to-date and available, thus allowing for continuous or near continuous functionality.

On a (public) cloud computing platform, cloud computing region 210-1 may include the ability to use a different type of data center or group of data centers, which can be referred to as local zones 220. For instance, a client, such as a provider of the hybrid cloud cellular network can select from more options of the computing resources that can be reserved at an availability zone compared to a local zone. However, a local zone may provide computing resources nearby geographic locations where an availability zone is not available. Therefore, to provide low latency, certain network components, such as regional data centers, can be implemented at local zones 220 rather than availability zones 215. In some circumstances, a geographic region can have both a local zone and an availability zone.

In the topology of a 5G NR cellular network, 5G core functions of core 139 can logically reside as part of a national data center (NDC). NDC 230 can be understood as having its functionality existing in cloud computing region 210-1 across multiple availability zones 215. At NDC 230, various network functions, such as NFs 232, are executed. For illustrative purposes, each NF, whether at NDC 230 or elsewhere located, can be comprised of multiple sub-components, referred to as pods (e.g., pod 211) that are each executed as a separate process by the cloud computing environment. The illustrated number of pods is merely an example; fewer or greater numbers of pods may be part of the respective 5G core functions. It should be understood that in a real-world implementation, a cellular network core, whether for 5G or some other standard, can include many more network functions. By distributing NFs 232 across availability zones, load-balancing, redundancy, and fail-over can be achieved. In local zones 220, multiple regional data centers 240 can be logically present. Each of regional data centers 240 may execute 5G core functions for a different geographic region or group of RAN components. As an example, 5G core components that can be executed within an RDC, such as RDC 240-1, may be: UPFs 250, SMFs 260, and AMFs 270. While instances of UPFs 250 and SMFs 260 may be executed in local zones 220, SMFs 260 may be executed across multiple local zones 220 for redundancy, processing load-balancing, and fail-over.

Figure 3:
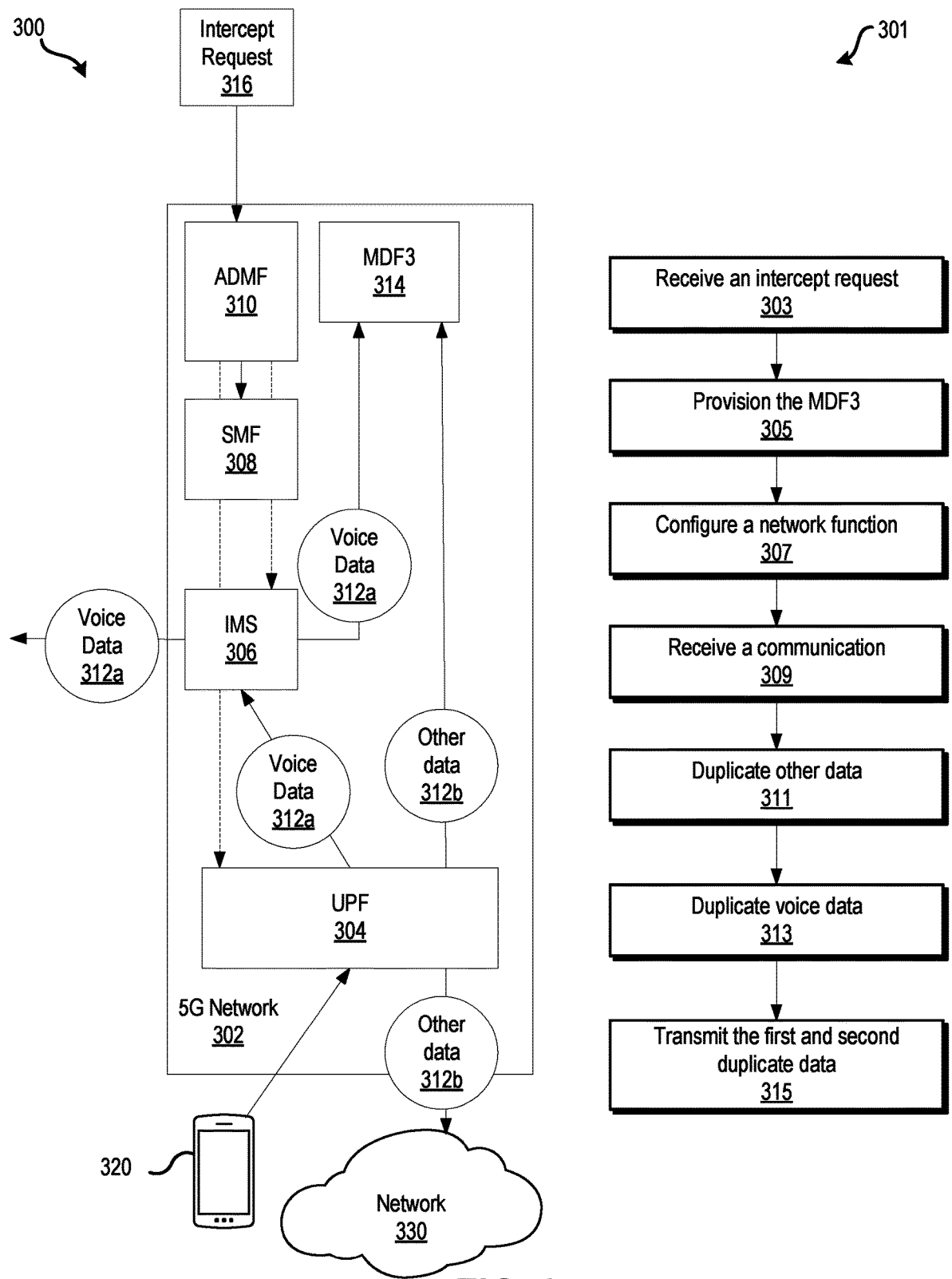
FIG. 3 illustrates a system and a process for intercepting communications data in a 5G network, according to certain embodiments.

FIG. 3 illustrates a system 300 and a process 301 for intercepting communications data in a 5G network 302, according to certain embodiments. The system 300 may include the 5G network 302. The 5G network 302 may be similar to the system 100 described in FIGS. 1A-B and 2. The 5G network 302 may therefore include similar components and functionalities, even if not illustrated in FIG. 3. The 5G network 302 may include a UPF 304, an IMS 306, and SMF 308, ad ADMF 310, and an MDF3 314. Some or all of the 5G network 302 may be implemented on a distributed cloud-based architecture. The 5G network 302 may provide wireless service to one or more UE's such as a UE 320. To provide the wireless service, the 5G network 302 may be configured to provide data to a network 330 (e.g., the internet) and/or to route voice calls and data through the IMS 306. It should be understood that other components, such as and SBC may be present and perform one or more functions to enable the normal operation of the 5G network 302.

At step 303, a 5G wireless network provider associated with the 5G network 302 may receive an intercept request 316. The 5G wireless network provider may provide the intercept request 316 to the ADMF 310. The intercept request 316 may identify one or more data types to be intercepted. For example, the intercept request 316 may identify that voice data and other data (e.g., internet data) is to be intercepted for a period of time (e.g., one week). Thus, the 5G wireless network provider may be obligated to capture all voice data and other data for the period of time.

At step 305, the ADMF 310 may begin a provisioning process within the 5G network 302. The ADMF 310 may cause the MDF3 314 to be instantiated within the 5G network 302. The MDF3 314 may be associated with the target UE 320, or may be configured to provide any intercepted data from multiple target UEs to a LEA. In some embodiments, the MDF3 314 may already be instantiated within the 5G network 302. The ADMF 310 may therefore provision the MDF3 314 to provide intercepted data to the LEA pursuant to the intercept request.

At step 307, the ADMF 310 (via the SMF 308) may cause the UPF 304 to be configured to identify communications data based on a DNN for at least some of the communications associated with the target UE 320. The UPF 304 may be configured to not intercept any voice data associated with the target UE 320. The UPF 304 may also be configured to intercept all other data associated with the target UE 320 (e.g., internet data). The ADMF 310 may also configure the IMS 306 to intercept voice data associated with the target UE. Thus, the UPF 304 and the IMS 206 may be configured to intercept communications data based on the DNN of a data type of a communication. In intercepting communications data, the UPF 304 and the IMS 306 may be configured to duplicate communications data of a certain data type and transmit the duplicated communications data to the MDF3 314. The original communications data may also be transmitted to the intended recipient.

At step 309, the 5G network may receive a communication from the target UE 320. The communication may be received by the UPF 304. The communication may include one or more data types. For example, the communication may include voice data 312*a* and other data 312*b*. The UPF 304 may identify the voice data 312*a* at least in part by a voice-DNN associated with the voice data 312*a*. Similarly, the UPF 304 may identify the other data by a DNN associated with the other data 312*b*. For example, the other data 312*b* may be internet data, and thus be identified as such via an internet-DNN. In another example, the other data 312*b* may be MMS data, identified as such by an MMS-DNN.

At step 311, the UPF 304 may duplicate the other data 312*b* according to the configuration provided by the ADMF 310. The replica of the other data may be an identical record of the other data 312*b*. For example, if the other data 312*b* is internet data, the other data 312*b* may include an IP address, metadata associated with a particular application, text delivered through an application, and other such data. The UPF 304 may not duplicate the voice data 312*a*, also according to the configuration provided by the ADMF 310. Instead, the UPF 304 may provide the voice data 312*a* to the IMS 306, according to normal operations.

At step 313, the IMS 306 may duplicate the voice data 312*a*. Based in part on functionalities of the IMS 306, the voice data 312*a* may include call back information, call forwarding information, a recipient number associated with the voice data 312*a*, and other such information.

At step 315, the IMS 306 may transmit the voice data 312*a* to the MDF3 314. The IMS 306 may also transmit the voice data 312*a* to an intended recipient via other network functions. Similarly, the UPF 304 may transmit the other data 312*b* to the MDF3 314. The UPF 304 may also transmit the other data 312*b* to an intended recipient. For example, if the other data 312*b* is internet data associated with a website or other web-based service, the UPF 304 may provide the other data 312*b* to the network 330. If the other data includes MMS data, the UPF 304 may provide the other data 312*b* to a multimedia messaging service controller (MMSC) to subsequently be transmitted to the intended recipient. One of ordinary skill in the art would recognize many different possibilities and configurations.

Figure 4:
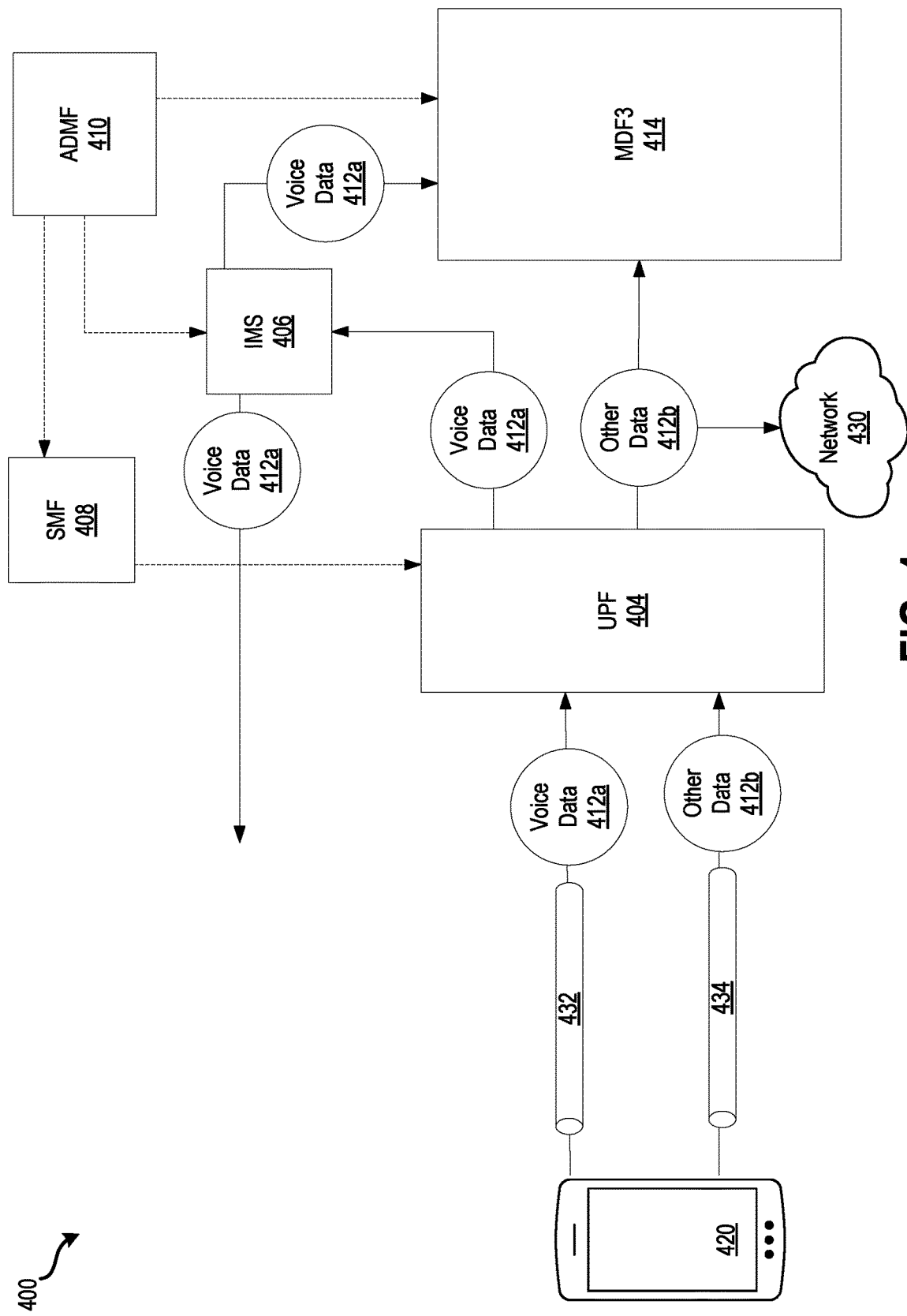
FIG. 4 illustrates a system for identifying and intercepting data via DNNs, according to certain embodiments.

FIG. 4 illustrates a system 400 for identifying and intercepting data per DNNs 432 and 434, according to certain embodiments. The system 400 may be similar to the system 300 in FIG. 3 and include similar components and functionalities. The system 400 may also be similar to the system 100 in FIGS. 1A-B. The system 400 may include a UPF 404, an IMS 406, an SMF 408, an ADMF 410, and an MDF3 414. The system 400 and components thereof may be part of a standalone 5G network, implemented in a distributed cloud-based architecture.

The UPF 404 may be initially configured to enable communications between one or more UEs and other components of the system 400 and/or intended recipients of the communications. In order to enable the communications, the UPF 404 may utilize one or more DNNs to identify the appropriate anchor functions needed to process communications from a UE. For example, a DNN 432 may be a voice-DNN. The UPF 404 may therefore recognize that any data received through or indicating the DNN 432 is voice data and should be routed to the IMS 406. A DNN 434 may be an internet-DNN. The UPF 404 may therefore recognize the any data received through or indicating the DNN 434 should be directed to a network 430 (e.g., the Internet). Although only two DNNs 432-434 are shown, it should be understood that any number of DNNs may be present. For example, the UPF 404 may receive data from an MMS-DNN and therefore direct the data to an MMSC.

The IMS 406 may be initially configured to resolve voice calls including IP-based voice calls (e.g., VoIP, VoWiFi, etc.). The IMS 406 may also collect other voice call-related information such as call forwarding information, call back information, recipient information, and other such information. The SMF 408 may manage sessions established to provide voice calls and other such exchanges of data. The SMF 408 may also be configured to provide configuration data to one or more of other network functions in the system 400, such as the IMS 406 and the UPF 404.

The ADMF 410 may provide administrative functions for other network functions of the system 400. For example, the ADMF 410 may provide configuration/provisioning instructions to the various network functions. The ADMF 410 may also cause one or more network functions to be instantiated within the system 400, such as the MDF3 414. The MDF3 414 may be instantiated in response to an intercept request (e.g., the intercept request 316 in FIG. 3), or may be included in the system 400 more generally. The MDF3 414 may be configured to provide intercepted data to an LEA. In some embodiments, the MDF3 414 may be associated with a single UE, such as a target UE 420. In other embodiments, the MDF3 414 may be configured to provide intercepted data from any UE, per an intercept request. Additionally or alternatively, the MDF3 414 may be associated with a single LEA, or may be associated with multiple LEAs.

An intercept request received from an LEA may request that voice data and/or other data associated with the target UE 420 be intercepted. In response, the ADMF 410 may, at least in part, provision the system 400 to intercept the voice data and/or other data associated with the target UE 420. The ADMF 410 may provision the MDF3 414 (as described above) to transmit intercepted data to the LEA. The ADMF 410 may also cause the SMF 408 (and/or other network functions) to reconfigure other network functions. The SMF 408 may then configure the UPF 404 to intercept other data received via the DNN 434 and to not intercept any data received via the DNN 432. The SMF 408 may also configure the IMS 406 to intercept voice data. In both the UPF 404 and the IMS 406, intercepting may include duplicating communications data (e.g., voice data and other data) and transmitting the duplicated communications data to the MDF3 414.

The target UE 420 may then transmit voice data 412*a* to the system 400 via the DNN 432. The voice data 412*a* may include an IP-based voice call such as VoIP, VoWiFi, etc. The UPF 404 may identify the voice data 412*a* as such because it is received via the DNN 432. The UPF 404 may then transmit the voice data 412*a* to the IMS 406 for further processing (e.g., resolution of a recipient phone number etc.). According to the configuration instructions provided by the ADMF 410 and/or the SMF 408, the IMS 406 may then generate a duplicate of the voice data 412*a*. Because the duplicate of the voice data 412*a* is generated by the TIS 406, the voice data 412*a* may include information such as call forwarding information, call back information, and other such call data. The IS 406 may then transmit the voice data 412*a* to the MDF3 414. The IMS 406 may also transmit the voice data 412*a* to an intended recipient. The MDF3 414 may then transmit the voice data 412*a* to the LEA.

Additionally or alternatively, the target UE may transmit other data 412*b* to the system 400 per the DNN 434. In the example shown in FIG. 4, the other data 412*b* may be internet data. The UPF 414 may identify the other data 412*b* as internet data because it is received via the DNN 434. Then, according to the configuration provided by the ADMF 410 and/or the SMF 408, the UPF 404 may generate a duplicate of the other data 412*b*. In the case of internet data, the other data 412*b* may include an IP-address, query terms, text associated with an application, or other such information. The UPF 404 may transmit the other data 412*b* to the MDF3 414 and (in the case of certain internet data) the network 430. The MDF3 414 may then transmit the other data 412*b* to the LEA.

Other configurations besides those described in relation to FIG. 4 may be possible. For example, an MMSC may be configured to duplicate MMS intercepted data and transmit the duplicated MMS intercepted data to the MDF3 414. The UPF 404 may be configured, therefore, to not intercept MMS data at all, such that the LEA only receives one copy of the MMS data. Additionally or alternatively, the UPF 404 may not be configured to intercept SMS data. Instead, a short messaging service controller (SMSC) may be configured to intercept SMS data. Similarly, a network function may be configured to intercept internet data. In other words, in some embodiments, the UPF 404 may not intercept any data, with interception functions instead delegated to other network functions, thus avoiding providing the LEA with duplicates. Other solutions may also be possible, such as providing a separate UPF for various data types.

Figure 5:
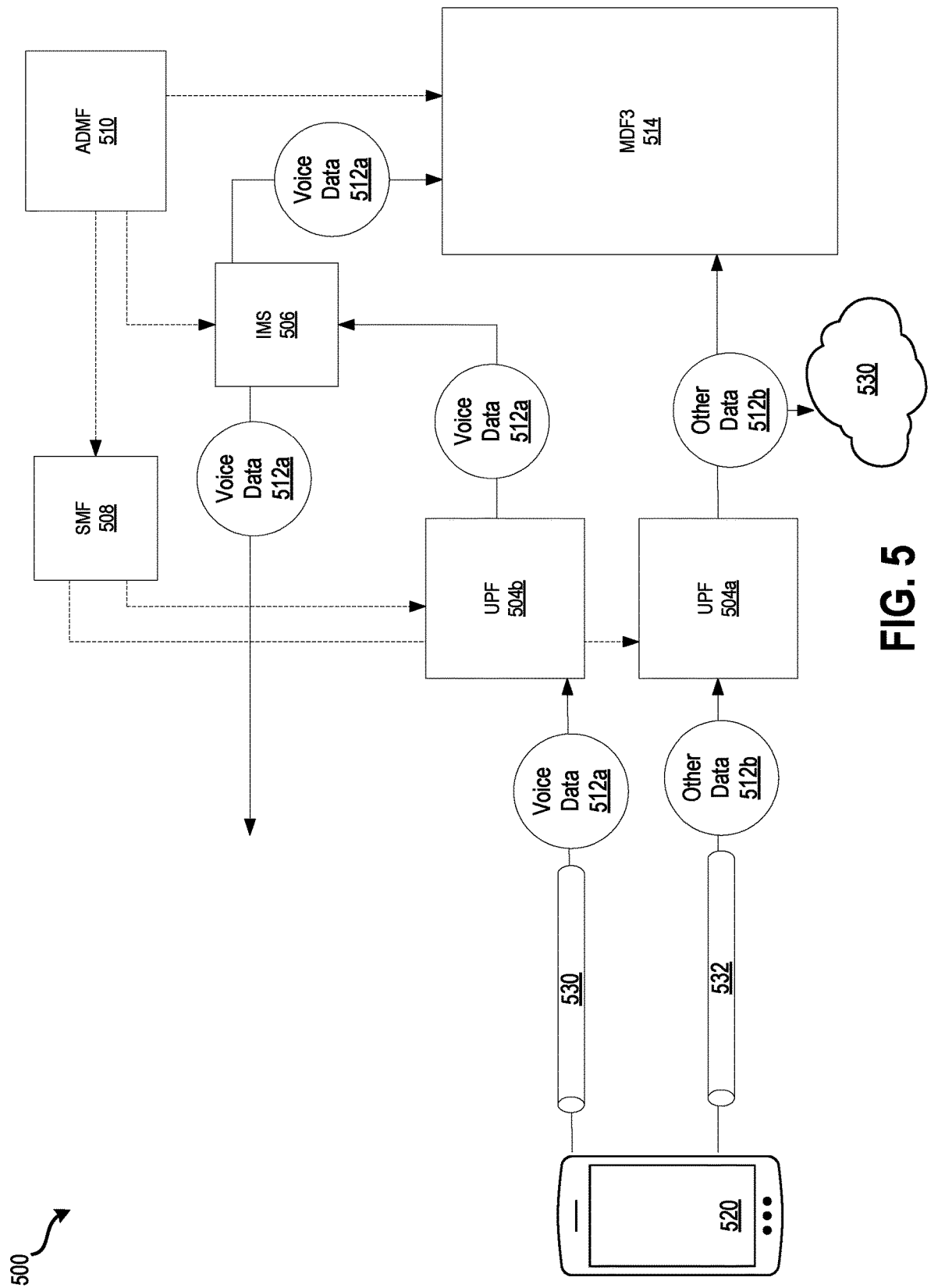
FIG. 5 illustrates a system with two UPFs for intercepting data, according to certain embodiments.

FIG. 5 illustrates a system 500 with two UPFs 504*a-b* for intercepting data, according to certain embodiments. The system 500 may be part of a 5G network such as the system 100 in FIGS. 1A-B and/or the 5G network 302 in FIG. 3 and include similar components and functionalities. The system 500 may be implemented instead of or in addition to the system 400. The system 500 may include the UPFs 504*a-b*, an IMS 506, an SMF 508, an ADMF 510, and an MDF3 514. The system 500 may provide wireless services to one or more UEs, such as voice service, data service, messaging services, etc.

The UPF 504*a* may be similar to the UPF 404 in FIG. 4. The UPF 404 may be initially configured to enable communications between one or more UEs and other components of the system 500 and/or intended recipients of the communications. In order to enable the communications, the UPF 504*a* may utilize one or more DNNs to identify the appropriate network functions needed to process communications from a UE. For example, a DNN 532 may be a voice-DNN. The UPF 504*a* may therefore recognize that any data received through or indicating the DNN 532 is voice data and should be routed to the IMS 506. A DNN 534 may be an internet-DNN. The UPF 504*a* may therefore recognize the any data received through or indicating the DNN 534 should be directed to a network 530 (e.g., the Internet). Although only two DNNs 532-534 are shown, it should be understood that any number of DNNs may be present. For example, the UPF 504*a* may receive data over an MMS-DNN and therefore direct the data to an MMSC. Although FIG. 5 illustrate only the DNN 534 being directed to the UPF 504*a*, it should be understood that in general operation, and for devices other than the target UE 520, the DNN 532 (and other DNNs) are also anchored at the UPF 504*a*.

The IMS 506 may be initially configured to resolve voice calls including IP-based voice calls (e.g., VoIP, VoWiFi, etc.). The IMS 506 may also collect other voice call-related information such as call forwarding information, call back information, recipient information, and other such information. The SMF 508 may manage sessions established to provide voice calls and other such exchanges of data. The SMF 508 may also be configured to provide configuration data to one or more of other network functions in the system 500, such as the IMS 506 and the UPF 504*a*.

The ADMF 510 may provide administrative functions for other network functions of the system 500. For example, the ADMF 510 may provide configuration/provisioning instructions to the various network functions. The ADMF 510 may also cause one or more network functions to be instantiated within the system 500, such as the MDF3 514. The MDF3 514 may be instantiated in response to an intercept request (e.g., the intercept request 316 in FIG. 3), or may be included in the system 500 more generally. The MDF3 514 may be configured to provide intercepted data to an LEA. In some embodiments, the MDF3 514 may be associated with a single UE, such as a target UE 420. In other embodiments, the MDF3 514 may be configured to provide intercepted data from any UE, per an intercept request. Additionally or alternatively, the MDF3 514 may be associated with a single LEA, or may be associated with multiple LEAs.

An intercept request received from an LEA may request that voice data and/or other data associated with the target UE 520 be intercepted. In response, the ADMF 510 may, at least in part, provision the system 500 to intercept the voice data and/or other data associated with the target UE 520. The ADMF 510 may provision the MDF3 514 (as described above) to transmit intercepted data to the LEA. The ADMF 510 may also cause the SMF 508 (and/or other network functions) to reconfigure other network functions. The SMF 508 may then configure the UPF 504a to intercept other data 512b received via the DNN 534.

The ADMF 510, the SMF 508, and/or other network functions may also instantiate the UPF 504b. The UPF 504b may be configured to provide similar functions as the UPF 504a, except to only receive data via the DNN 532 from the target UE 520. In other words, the UPF 504a may continue to provide voice services and other wireless services for all other UEs besides the target UE 520, whereas the UPF 504a may only provide voice services for the target UE 520. In some embodiments, the UPF 504b may be configured to intercept voice data and transmit the voice data 512a to the MDF3 514. In other embodiments, the IMS 506 may be configured to intercept and transmit the voice data 512a to the MDF3 514. In either case, the voice data 512a sent to the system 500 via the DNN 532 by the target UE 520 and directed to the UPF 504b. Subsequently, the voice data 512a may be duplicated and transmitted to the MDF3 514. The other data 512b may be received by the system 500 via the DNN 534 from the target UE 520 and directed to the UPF 504a. The other data 512b may then be duplicated and transmitted to the MDF3 514.

Figure 6:
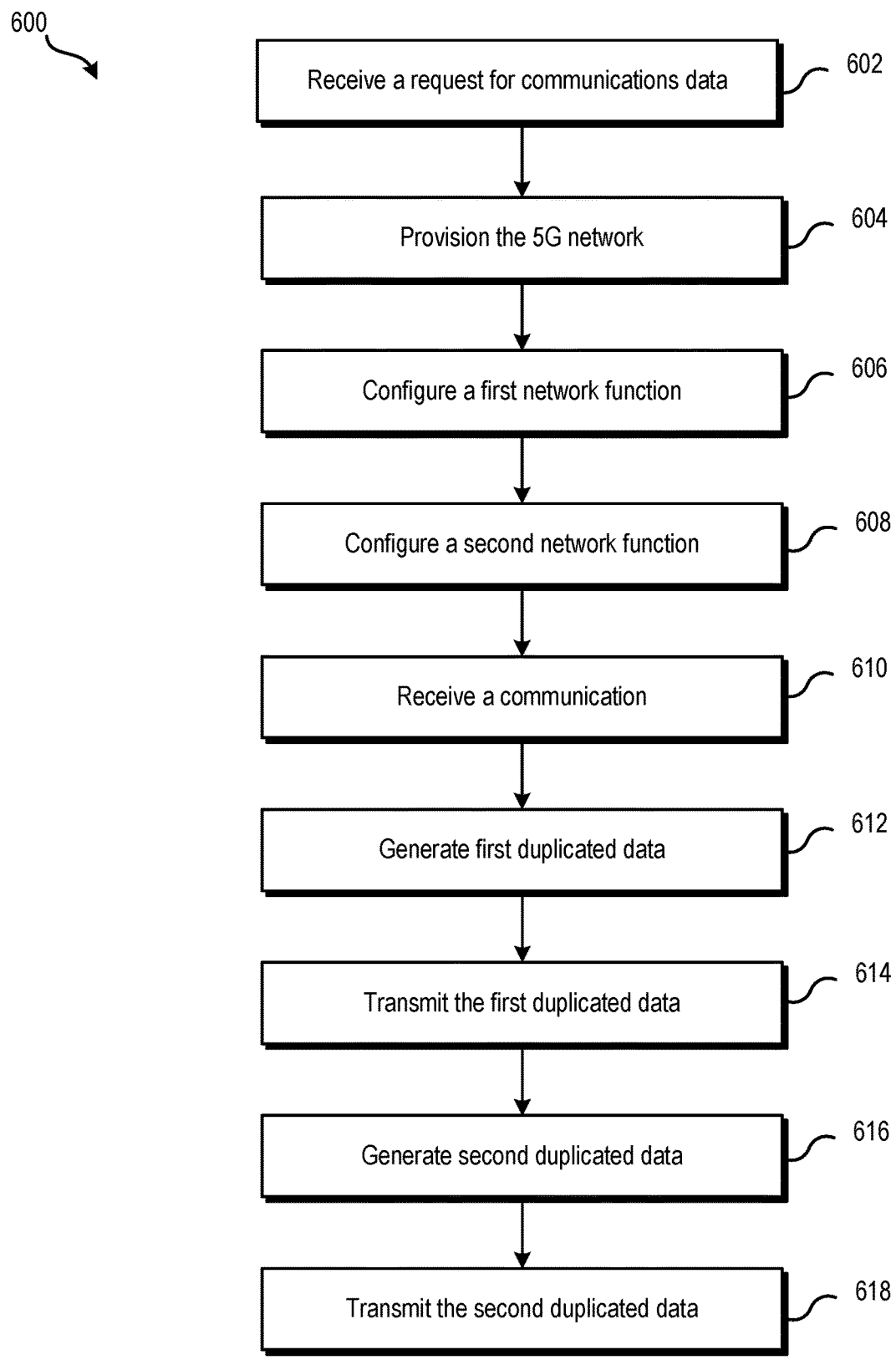
FIG. 6 illustrates a flowchart of a method for intercepting communications data, according to certain embodiments.

FIG. 6 illustrates a flowchart of a method 600 for intercepting communications data, according to certain embodiments. The method 600 may be performed by some or all of the systems described herein, such as the system 100 in FIGS. 1A-B, the system 300 in FIG. 3, the system 400 in FIG. 4, and/or the system 500 in FIG. 5. Some of the steps described in the method 600 may be performed in a different order than presented or combined with one or more other steps. At least some of the steps of the method 600 may be skipped altogether.

At step 602, the method 600 may include receiving, by an admin function of a 5G network, a request for communications data of a first data type and a second data type. The communications data may be associated with a target user equipment. The request for communications data may be an intercept request received by a 5G wireless network provider associated with the 5G network. The intercept request may be received from an LEA. The 5G wireless network provider may provide the request to the admin function via a computing device outside of the 5G network or via another network function of the 5G network. The 5G network may be a standalone 5G network, implemented in a distributed cloud-based architecture. The standalone 5G network may be hosted by a public cloud-services provider (e.g., Microsoft Azure®, Amazon Web Services®, etc.).

The first data type may include voice data. The second data type may include internet data. Other data types may also be included in the request, such as MMS data, SMS data, and other such data. In some embodiments, the request may indicate that only one data type is requested.

At step 604, the method 600 may include provisioning, by the admin function, the 5G network to fulfill the request for communications data. The admin function may perform provisioning operations independently or in conjunction with another network component. For example, the admin function may send instructions to an SMF of the 5G network (e.g., the SMF 408 in FIG. 4). The SMF may then perform some or all of the provisioning operations.

At step 606, the method 600 may include (as part of the provisioning) configuring, at least in part by the admin function, a first network function of the 5G network to generate first duplicated data. The first duplicate data may be based at least in part on the communications data of the first data type. For example, the first network function may be a UPF such as the UPF 404 in FIG. 5. The first data type may include internet data. Thus, the UPF may be configured to duplicate internet data received from the target UE.

At step 608, the method 600 may include (as part of the provisioning) configuring, at least in part by the admin function, a second network function of the 5G network to generate second duplicated data. The second duplicated data may be based on the communications data of the second data type. For example. The second network function may be an IMS such as the IMS 406 in FIG. 4. The second data type may be voice data. Thus, the IMS may be configured to duplicate voice data associated with the target UE.

At step 610, the method 600 may include receiving, by the first network function, at least one of a first communication of the first data type and a second communication of the second data type. Each of the first communication may be associated with the target UE and a respective intended recipient. For example, the first network function may receive an incoming SMS message from a third party directed to the target UE. Thus, the respective recipient may be the target UE. In another example, the second communication may be a voice call made by the target UE to a third party respective intended recipient. One of ordinary skill in the art would recognize many different configurations and possibilities.

At step 612, the method 600 may include generating, by the first network function, the first duplicated data, based at least in part on the first communication of the first data type. For example, the first network function may be a UPF, and the first data type may be internet data. The UPF may then generate a duplicate of the internet data. In some embodiments, the first data type may include SMS data, MMS data, or other such data.

At step 614, the method 600 may include transmitting, by the first network function, the first communication to the respective intended recipient. The first network function may also transmit the first duplicated data a mediation and delivery function (MDF3) of the 5G network. The MDF3 may then transmit the first duplicated data to a LEA associated with the request for communications data.

At step 616, the method 600 may include generating, by the second network function, second duplicated data. The second duplicated data may be based on the second communication of the second data type. For example, the second communication may be a voice call. Thus, the first network function (e.g., the UPF) may provide voice data to an IMS of the 5G network (i.e., the second network function). The IMS may then generate a duplicate of the voice data.

At step 618, transmitting, by the second network function, the second communication to the respective intended recipient. The second network function may also transmit the second duplicated data a mediation and delivery function (MDF3) of the 5G network. The MDF3 may then transmit the second duplicated data to a LEA associated with the request for communications data.

In some embodiments, the method 600 may also include determining, by the first network function, the first data type of the first communication based at least in part on a DNN. For example, the first network function may receive the first communication via a first DNN. The first DNN may be similar to the DNN 434 in FIG. 4. Thus the first network function may identify the first communication as other data (e.g., internet data, MMS data, SMS data, etc.). The method 600 may also include determining, by the first network function, the second data type of the second communication based on a second DNN. Continuing the example from above, the second communication may be received via a DNN such as the DNN 432. The first network function may therefore determine that the second data type is voice data.

In some embodiments, provisioning the 5G network to fulfill the request may include instantiating the MDF3 within the 5G network. The MDF3 may be associated with the LEA and/or the target UE. The MDF3 may be configured to receive the first duplicated data and the second duplicated data via a different interface than that used by the admin function. For example, the admin function may operate on an X1 interface, whereas the MDF3 may operate on an X3 interface.

Although the methods and systems described herein reference specific 5G networks and functions, similar methods may be performed on other systems. For example, a 4G network may utilize an access point name (APN) to identify a data type as opposed to a DNN in a 5G network. Furthermore, some wireless networks may include both 4G and 5G components. Such a system may utilize DNNs and/or APNs to determine a data type during a lawful intercept. In other examples, similar systems and methods may be used in a 6G wireless network.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method, comprising:
   receiving, by an admin function of a wireless network, a request for communications data of a first data type and a second data type, the communications data associated with a target user equipment;
   provisioning, by the admin function, the wireless network to fulfill the request for communications data, the provisioning further comprising:
      configuring, at least in part by the admin function of the wireless network, a first network function of the wireless network to generate first duplicated data based on the communications data of the first data type;
      configuring, at least in part by the admin function of the wireless network, a second network function of the wireless network to generate second duplicated data based on the communications data of the second data type;
   receiving, by the first network function of the wireless network, at least one of a first communication of the first data type and a second communication of the second data type, each of the first communication and the second communication associated with the target user equipment and a respective intended recipient;
   generating, by the first network function of the wireless network, the first duplicated data based on the first communication of the first data type;
   transmitting, by the first network function of the wireless network, the first communication to a respective intended recipient and the first duplicated data to a mediation and delivery function of the wireless network;
   generating, by the second network function of the wireless network, the second duplicated data based on the second communication of the second data type; and
   transmitting, by the second network function of the wireless network, the second communications of the second data type to the respective intended recipient and the second duplicated data to the mediation and delivery function such that the request is fulfilled.

2. The method of claim 1, further comprising:
- determining, by the first network function of the wireless network, the first data type of the first communication based at least in part on a first data network name and/or a second access point name; and
- determining, by the first network function of the wireless network, the second data type of the second communication based at least in part on a second data network name and/or a second access point name.

3. The method of claim 1, wherein the second communication of the second data type comprises voice data and the first network function is a user plane function.

4. The method of claim 1, wherein the second network function is an internet protocol multimedia subsystem.

5. The method of claim 1, wherein the mediation and delivery function is associated with a law enforcement agency.

6. The method of claim 1, wherein the first communication of the first data type comprises at least one of multimedia messaging service data and internet data, and the first network function is a user plane function.

7. The method of claim 1, wherein the first network function is a first user plane function configured to process voice data and the second network function is a second user plane function configured to process at least one of internet data, multimedia messaging system data, and short messaging system data.

8. The method of claim 1, wherein the request is received from the admin function over a first interface and at least one of the first duplicate data and the second duplicate data is transmitted to the mediation and delivery function over a second interface.

9. The method of claim 1, wherein provisioning the wireless network further comprises instantiating the mediation and delivery function.

10. A system, comprising:
- one or more processors; and
- a non-transitory, computer-readable medium comprising instruction that, when executed by the one or more processors, cause the system to perform operations to:
  - receive, by an admin function of a wireless network, a request for communications data of a first data type and a second data type, the communications data associated with a target user equipment;
  - provision, by the admin function, the wireless network to fulfill the request for communications data, the provisioning further comprising:
    - configure, at least in part by the admin function of the wireless network, a first network function of the wireless network to generate first duplicated data based on the communications data of the first data type;
    - configure, at least in part by the admin function of the wireless network, a second network function of the wireless network to generate second duplicated data based on the communications data of the second data type;
  - receive, by the first network function of the wireless network, at least one of a first communication of the first data type and a second communication of the second data type, each of the first communication and the second communication associated with the target user equipment and a respective intended recipient;
  - generate, by the first network function of the wireless network, the first duplicated data based on the first communication of the first data type;
  - transmit, by the first network function of the wireless network, the first communication to a respective intended recipient and the first duplicated data to a mediation and delivery function of the wireless network;
  - generate, by the second network function of the wireless network, the second duplicated data based on the communication of the second data type; and
  - transmit, by the second network function of the wireless network, the second communications data of the second data type to the respective destination and the second duplicated data to the mediation and delivery function such that the request is fulfilled.

11. The system of claim 10, wherein the operations further cause the system to:
- determine, by the first network function of the wireless network, the first data type of the first communication based at least in part on at least one of a first data network name and/or a first access point name; and
- determine, by the first network function of the wireless network, the second data type of the second communication based at least in part on a second data network name and/or a second access point name.

12. The system of claim 11, wherein the admin function utilizes at least one of the first data network name, a first access point name, and the second data network name, and a second access point name, to configure the first network function and the second network function.

13. The system of claim 10, wherein the mediation and delivery function is associated with at least one of a law enforcement agency and the target user equipment.

14. The system of claim 10, wherein the mediation and delivery function is configured to transmit data associated with a plurality of target user equipment corresponding to a plurality of requests.

15. The system of claim 10, wherein the wireless network comprises a standalone 5G network.

16. A non-transitory computer-readable medium comprising instructions that, when executed by a processor, cause the processor to perform operations comprising:
- receiving, by an admin function of a wireless network, a request for communications data of a first data type and a second data type, the communications data associated with a target user equipment;
- provisioning, by the admin function, the wireless network to fulfill the request for communications data, the provisioning further comprising:
  - configuring, at least in part by the admin function of the wireless network, a first network function of the wireless network to generate first duplicated data based on the communications data of the first data type;
  - configuring, at least in part by the admin function of the wireless network, a second network function of the wireless network to generate second duplicated data based on the communications data of the second data type;
- receiving, by the first network function of the wireless network, at least one of a first communication of the first data type and a second communication of the second data type, each of the first communication and the second communication associated with the target user equipment and a respective intended recipient;
- generating, by the first network function of the wireless network, the first duplicated data based on the first communication of the first data type;

transmitting, by the first network function of the wireless network, the first communication to a respective intended recipient and the first duplicated data to a mediation and delivery function of the wireless network;

generating, by the second network function of the wireless network, the second duplicated data based on the communication of the second data type; and transmitting, by the second network function of the wireless network, the second communications data of the second data type to the respective destination and the second duplicated data to the mediation and delivery function such that the request is fulfilled.

17. The non-transitory computer-readable medium of claim 16, wherein provisioning the wireless network further comprises instantiating the mediation and delivery function.

18. The non-transitory computer-readable medium of claim 16, wherein the first network function is a first user plane function configured to process voice data and the second network function is a second user plane function configured to process at least one of internet data, multimedia messaging system data, and short messaging system data.

19. The non-transitory computer-readable medium of claim 16, wherein the request is received from the admin function over a first interface and at least one of the first duplicate data and the second duplicate data is transmitted to the mediation and delivery function over a second interface.

20. The non-transitory computer-readable medium of claim 16, wherein the admin function utilizes at least one of a first data network name and a second network name to configure the first network function and the second network function.

* * * * *